Sept. 28, 1965   L. J. DUFFY, JR   3,209,301
PLUG-IN BUS DUCT
Filed Sept. 12, 1960
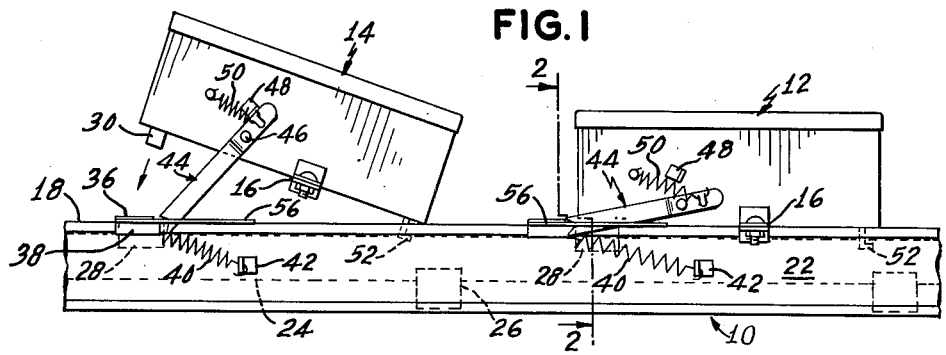
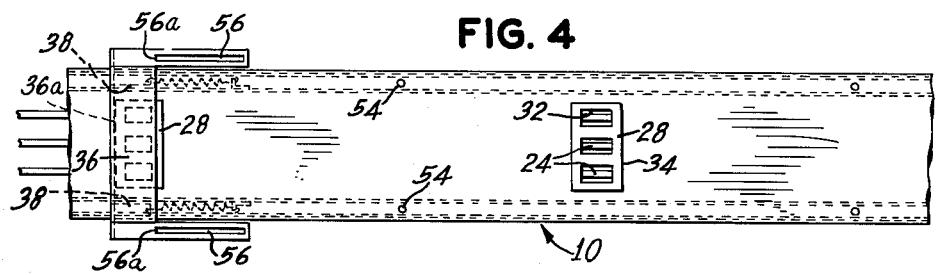
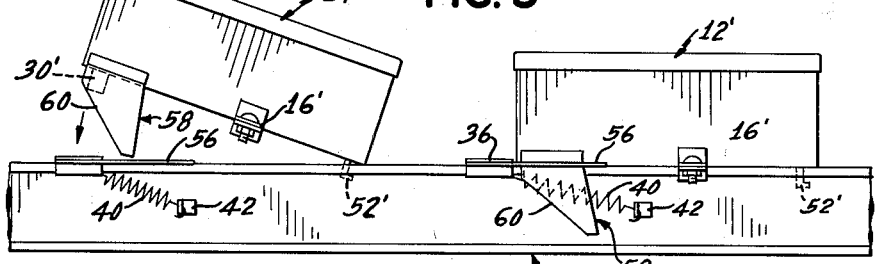
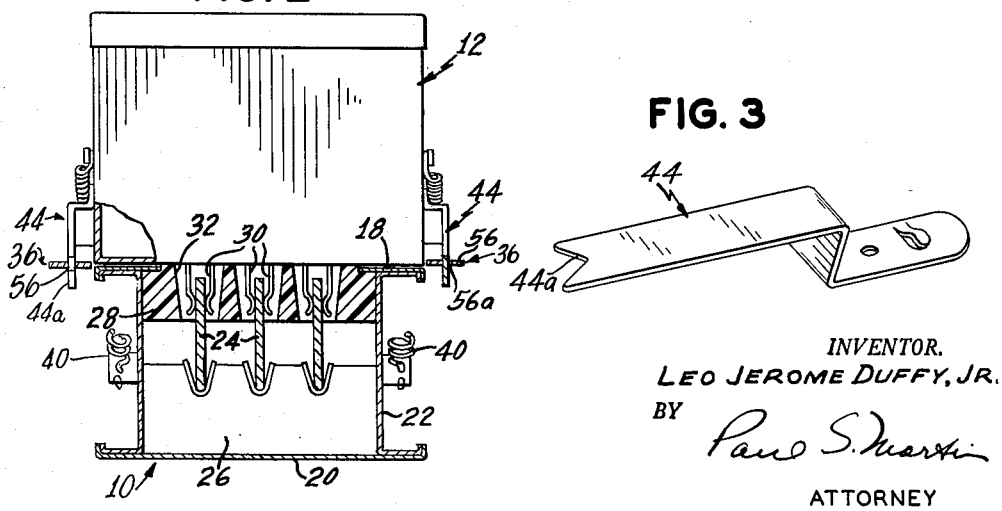
INVENTOR.
LEO JEROME DUFFY, JR.
BY
ATTORNEY

United States Patent Office 3,209,301
Patented Sept. 28, 1965

3,209,301
PLUG-IN BUS DUCT
Leo Jerome Duffy, Jr., West Pittston, Luzerne, Pa., assignor to Federal Pacific Electric Company, a corporation of Delaware
Filed Sept. 12, 1960, Ser. No. 55,430
9 Claims. (Cl. 339—22)

The present invention relates to plug-in bus duct and plug-in units therefor.

As may be seen from U.S. Patent 2,306,353 issued Dec. 22, 1942 to L. W. Cole et al., bus duct having provision for receiving plug-in contacts of plug-in units has for long been known. In this patent, the opening through which the contacts of a plug-in unit are admitted through the wall of the bus duct may be protected by a particular insulator structure so that accidental short-circuiting of the bus bars to each other or between a bus bar and the enclosing metal duct is a remote possibility. Despite this protection, it is sometimes required that those openings in the duct which are not being used by plug-in units shall be covered. In order to mount a plug-in unit in place it has heretofore been customary to manually withdraw the cover under such conditions as to make it virtually impossible for an electrician to be endangered in any way by accidental contact with a bus bar through an uncovered opening. An object of this invention is to improve existing standard plug-in bus duct and plug-in units with a minimum of additional structural complexity and, more particularly, without resort to mechanically operable plug-in contacts that are movably mounted in the plug-in unit.

An additional object of the invention resides in the provision of a novel relatively movable cover and bus duct structure that is cooperable with related parts of a plug-in device characterized by a minimum of complexity, by fully exposed elements whose operative condition may be directly verified by inspection; and by a high degree of reliability which is in turn related to the minimized number of added elements for the function desired.

As will be seen from the following detailed description and the drawings, two illustrative embodiments of the invention are disclosed. These include protected plug-in bus duct having a sliding cover for each plug-in opening in the duct with a spring normally biasing the cover into position overlying the opening. Cover-actuating elements in two different forms are disclosed which drive the cover into unobstructing position as the plug-in contacts of the plug-in unit approach the bus bars. These embodiments have readily separable elements remote from the plug-in contact of the plug-in unit, providing a fulcrum effective to develop cover-operating force as the plug-in unit is swung against the bus duct, and just before its contacts enter the opening in the duct to make engagement with the bus bars.

The nature of the invention and its various additional objects and features of novelty will be more fully appreciated from the following detailed description of the illustrative embodiments shown in the accompanying drawings. In those drawings:

FIG. 1 is the plan view of a plug-in bus duct and two plug-in units representing one embodiment of the invention;

FIG. 2 is a transverse cross-section of the apparatus in FIG. 1 taken generally along the line 2—2 therein;

FIG. 3 is a perspective view, drawn to somewhat enlarged scale, showing one of the elements of the embodiment in FIGS. 1 and 2;

FIG. 4 is the side elevation of the bus duct in FIGS. 1 and 2, with one of the slide covers and its springs removed from one of the plug-in openings; and FIG. 5 is the top plan view of another embodiment of the invention.

Referring now to the embodiment of FIGS. 1 to 4 inclusive, there is shown a length of bus duct 10 with two identical plug-in units 12 and 14. Plug-in unit 12 is in its fully inserted, operative position on bus duct 10, being fastened in position with conventional clamping devices 16. Plug-in unit 14 is shown in the initial assembled position prior to the swinging stroke involved in assuming the position of unit 12.

The bus duct, as represented for example in the above-mentioned patent to L. W. Cole et al., includes an opposed pair of wide sheet-metal walls 18 and 20 that are fastened as by marginal screws to relatively narrow sheet-metal walls 22. Three bus bars 24 are illustrated which are supported in insulators 26 and 28, that are suitably distributed along the bus bars for fixing the bus bars in proper spaced relationship to each other and to the enclosing rectangular duct.

Plug-in units 12 and 14 include projecting plug-in contacts 30 in the form of resilient clips that are mounted fixedly in their respective plug-in units. As is conventional, contacts 30, which engage the respective bus bars 24, are insulated from each other in the plug-in unit. Insulators 28 have passages 32 for admitting the plug-in contacts. As seen in FIG. 4, bus duct wall 18 has an opening 34 through which a projecting portion of insulator 28 extends.

As seen at the left of both FIGS. 1 and 4, a slidable cover 36 is positioned above insulator 28 and has in-turned marginal portions 38 which underlie the marginal flanges of the bus duct illustrated in FIG. 2. A pair of tension springs 40 extend between cover flanges 38, respectively, and respective brackets 42 secured to the side walls 22 of the bus duct. Springs 40 are in tension and hold cover 36 in position over insulator 28, the cover being arrested in position by any suitable stop means, as for example, by a downward turned edge 36a (FIG. 4) that engages the projecting portion of insulator 28.

At opposite sides of each plug-in unit there is pivoted an actuator 44, secured to side walls of the plug-in unit by a pivot 46 and tensioned against a stop 48 on the side wall of the plug-in unit by a coil spring 50. Spaced substantially far from the plug-in contact 30 is a pair of laterally spaced hooks 52 (FIG. 1) which are received in corresponding holes 54 (FIG. 4) in the bust duct flanges. Each sliding cover 36 includes a slot 56, the left-hand edge 56a of which is engaged by the notched end 44a (FIG. 3) of cover actuator 44 when the process of plug-in mounting of the plug-in unit has proceeded to the stage illustrated in FIG. 1. Thereafter, further swinging of the plug-in unit toward the bus duct causes pivoting of actuator 44 and this, in turn, drives cover 36 along the bus duct so as to remove the cover from its obstructing position across insulator 28. The cover-removal process is sufficiently advanced when plug-in contacts 30 get close to the bus duct so that these plug-in contacts are admitted to passages 32. When the plug-in process has been completed, clamping fittings 16 are properly arranged and tightened as illustrated at the right in FIG. 1 and at the left in FIG. 1 for fastening the plug-in unit to the duct positively. It will be understood that there is a pair of actuators 44, one at each side of each plug-in unit; and there is also a pair of clamping devices 16 at the opposite sides, respectively, of each plug-in unit. When a plug-in unit is removed by the simple procedure of removing or loosening the clamping devices 16 and swinging the plug-in unit away from the bus duct about its separable hinge elements 52 and 54, the spring 40 at the opposite sides of the bus duct return cover 36 to position concealing the openings. Elements 50 and 54 are referred to as separable hinge elements inasmuch as they coact in the manner of a hinge without more ado than the motion of bringing them into contact with each other.

It is thus apparent that a plug-in unit and a bus duct with a protective cover over each opening cooperate in a manner to maintain safety of the operating personnel, yet a bare minimum of complicating structure is included for achieving this result. Plug-in units are of such size and weight that an electrician naturally has his hands fully occupied during the plug-in operation and so there is no hazard arising from the fact that the plug-in openings of the duct are, technically, in an open condition at a time when there is still some space between the approaching face of the plug-in unit and the opposed bus duct wall.

In the embodiment of the invention illustrated in FIG. 5 an actuator 58 is secured to plug-in units 12', 14' similar to the plug-in units 12, 14 illustrated in FIG. 1. Actuator or cam 58 fixed to these plug-in units replace pivoted cover-actuator 44 of FIGS. 1–4. Cam 58 is provided with a surface 60 which cooperates with a slot 56 formed in the cover plate 36. When the plug-in units are pivoted about laterally spaced coacting elements 52', each actuator 58 enters its slot 56 and cam surface 60 comes in contact with end 56a of the slot. Continued pivotal movements of the plug-in unit toward the duct engaging position shown to the right in FIG. 5 causes cover 36 to be withdrawn from its position overlying the openings 32 in insulator 28 by action of cam 58, reacting against elements 52'. The shape and size of cam 58 causes the cover to be withdrawn before the projecting ends of plug-in contacts 30' reach the openings 32. While a substantially triangular shape cam 58 has been illustrated it is evident that other shapes resulting in proper cover positioning may also be employed. After the plug-in unit has been completely inserted, it is clamped in position by operation of devices 16' at opposite sides, respectively, of each plug-in unit.

Removal of the plug-in unit from its duct engaging position results in the cover 36 being returned to its proper position by action of the springs 40.

In both embodiments above, the covers 36 have portions 56a engageable by the actuators 44a and 60 of the plug-in units for driving the covers out of bus-covering position. Slots 56 act as lateral and longitudinal guides for assuring alignment and cooperation between the projecting actuators and the cover. Moreover, the actuators and the slots enhance the effect of the laterally spaced hinge elements 52 in directing the plug-in contacts accurately toward the bus bars. The hinge elements or coacting means 52 on the bus duct and on the plug-in unit establish the position of the plug-in unit relative to the duct and also provide a reaction force resisting the cover shifting force developed when the gap between the unit and the duct is closed. In this manner, a "straight-on" thrust of the plug-in unit toward the bus duct will cause the cover 36 to be shifted from the position overlying the access openings leading to the bus bars within the duct unit. Additionally, the coacting means 52 effects the preliminary alignment of the plug-in contacts with those portions of the bus duct provided to receive those contacts.

The actuator 44 of the embodiment of FIG. 1 may be pivoted on pin 46 into longitudinal alignment with the axis of the plug-in unit for storage purposes thus providing an easily stored unit requiring only slightly additional longitudinal length than a plug-in unit not equipped with an actuator. The embodiment shown in FIG. 5, while requiring more storage space than the embodiment of FIG. 1, provides a more rigid actuator 58 which is less subject to becoming damaged in handling and additionally affords storage protection to the projecting contact clips 30'.

Bus duct 10 is a metal enclosure, generally rectangular in cross-section, containing therein the fixedly mounted bus bars to which the plug-in unit is to be connected. It will be observed that the pin portions 52 enter apertures 54 which are formed in the laterally projecting flanges of the bus duct. By positioning the coacting elements 52, 54 in the flange area outside the rectangular cross-section of the bus duct, the electrical problems which might arise if they entered the protected enclosure are avoided. It is also to be noted that the slidable cover and the cover actuating mechanism are external to the contained electrical portions of the bus duct.

The nature of the invention and various adaptations and modifications thereof will be readily appreciated by those skilled in that art in view of the foregoing description of the illustrative embodiments; and it is therefore appropriate that the invention should be broadly construed in accordance with its full spirit and scope.

What is claimed is:

1. In combination, a bus duct and a plug-in unit therefor, said bus duct including bus bars fixedly supported within a sheet metal enclosure, said enclosure having openings providing plug-in access to the bus bars, a cover slidable along the bus duct and movable between a position covering said opening and another position for affording plug-in access to said bars, spring bias means acting between the bus duct enclosure and the cover and effective normally to locate the cover in position to overlie said opening, and a plug-in unit having projecting plug-in contacts and cover operating levers pivotally mounted on said plug-in unit, said levers having notched cover contacting portions, said plug-in unit and said bus duct having separable portions spaced substantially from said plug-in contacts and effective to constrain said members into coaction with said cover during movement of a plug-in unit toward the bus duct and about said separable portions for driving said cover out of the plug-in path of said plug-in unit.

2. In combination, a bus duct and a plug-in unit therefor, said bus duct including bus bars fixedly supported within a sheet metal enclosure, said enclosure having openings providing plug-in access to the bus bars, a cover slidable along the bus duct and movable between a position covering said opening and another position for affording plug-in access to said bars, spring bias means acting between the bus duct and the cover and effective normally to locate the cover in position to overlie said opening, and a plug-in unit having projecting plug-in contacts and a cover operating lever pivotally mounted on said plug-in unit, spring means between said lever and said plug-in unit to extend said lever substantially forward of said projecting plug-in contact, said plug-in unit and said bus duct having separable coacting portions spaced substantially from said plug-in contacts and effective to constrain said members into coaction with said cover during movement of a plug-in unit toward the bus duct and for driving said cover out of the plug-in path of said plug-in unit, said plug-in unit having stop means cooperating with said cover operating lever for limiting its movement in response to bias by said spring means for locating said lever in position to cooperate with said cover initially.

3. A plug-in unit for bus duct including adjacent one end thereof a separable hinge element engageable with a like separable hinge element of a bus duct, projecting plug-in contacts extending from said plug-in unit spaced substantially from said separable hinge element, and a laterally projecting actuator carried by said plug-in unit, said actuator being mounted for pivotal movement on said plug-in unit and extending substantially forward of said plug-in contacts prior to the mounting of the plug-in unit on a bus duct, spring means resiliently urging said actuator into said forward position, said actuator including a portion engageable with a slidable cover with which the bus duct is equipped and arranged to operate the cover longitudinally of said bus duct during a plug-in operation of the plug-in unit.

4. In combination a bus duct and a plug-in unit therefor, said bus duct including a sheet metal enclosure and bus bars fixedly supported within said sheet metal enclosure, said enclosure having openings providing plug-in access to the bus bars, said enclosure having laterally projecting flanges, a cover slidable along said bus duct on said flanges and movable between a position covering one of said openings and another position for affording plug-in access to said bars, said cover having end portions extending beyond said flanges, spring bias means acting between the bus duct and the cover and effective normally to locate the cover in position to overlie said opening, said plug-in unit having projecting plug-in contacts and cover operating members, said plug-in unit and said bus duct having coacting members spaced substantially from said plug-in contacts and effective to constrain said cover operating members into coaction with said cover end portions during movement of a plug-in unit toward the bus duct for driving said cover out of the plug-in path of said plug-in contacts, said bus duct coacting members being disposed on said flanges.

5. In combination a bus duct and a plug-in unit therefor, said bus duct including a sheet metal enclosure and bus bars fixedly supported within said sheet metal enclosure, said enclosure having openings providing access to the bus bars, said enclosure having laterally projecting flanges, a cover slidable along said bus duct on said flanges and movable between a position covering one of said openings and another position for affording plug-in access to said bars, spring bias means acting between the bus duct and the cover and effective normally to locate the cover in position to overlie said opening, said plug-in unit having projecting plug-in contacts and cover operating members, coacting means on said bus duct and said plug-in unit to establish the position of said plug-in unit relative to said duct and to position said cover operating members relative to said cover and also to provide a reaction force for resisting the cover shifting force when said plug-in is moved toward the bus duct for driving said cover out of the plug-in path of said plug-in contacts, said bus duct coacting means being disposed at said flanges.

6. A plug-in bus duct for receiving a plug-in unit, said plug-in bus duct including a metal enclosure having front and back walls and opposed side walls, said front wall having flanges extending outwardly of said enclosure, bus bars extending longitudinally in said enclosure, an access opening in said front wall for admitting plug-in contacts of a plug-in unit, a cover mounted on the exterior of said front wall and having guide means for effecting longitudinal sliding of the cover between a position covering said opening and a position affording access to the bus bars through said opening, spring bias means acting between said cover and said bus duct urging said cover to a position covering said opening, and a separable hinge formation located in said front wall flanges and spaced substantially away from said cover lengthwise of said duct and formed to coact with complementary separable hinge means carried by a plug-in unit in the manner of a separable hinge.

7. The combination according to claim 4 wherein the cover operating members of said plug-in unit are formed to provide cams which project laterally and forwardly of said plug-in contacts, said cams engaging said cover end portions during movement of the plug-in unit toward the bus duct and driving the cover longitudinally of the bus duct.

8. The combination according to claim 4 wherein the projecting cover operating members of said plug-in unit include a laterally projecting actuator, said actuator extending substantially forward of said plug-in contacts prior to the mounting of a plug-in unit on bus duct, said actuator including a portion having a cam surface formed thereon for cooperation with said cover end portions for driving said cover along said enclosure during the plug-in operation of said plug-in unit.

9. The combination according to claim 4 wherein said cover operating members include a lever pivotally mounted on said plug-in unit, said lever having one end adapted to engage said cover, spring means between said lever and said plug-in unit to extend the cover engaging end of said lever substantially forward of said projecting plug-in contact, and stop means on said unit limiting the extension of said lever relative to said plug-in unit for thereby positioning the cover engaging end of said lever for cooperation with said cover.

References Cited by the Examiner

UNITED STATES PATENTS

| 536,266 | 3/95 | Chesney | 200—151 |
|---|---|---|---|
| 2,306,353 | 12/42 | Cole et al. | 392—22 |

FOREIGN PATENTS

| 1,220,077 | 1/60 | France. |
| 15,443 | 1898 | Great Britain. |
| 523,760 | 7/40 | Great Britain. |
| 59,785 | 1/24 | Sweden. |

JOSEPH D. SEERS, *Primary Examiner.*